United States Patent [19]
Nakashiba

[11] Patent Number: 6,160,580
[45] Date of Patent: Dec. 12, 2000

[54] CCD IMAGE SENSOR HAVING TWO-LAYERED ELECTRODE STRUCTURE

[75] Inventor: Yasutaka Nakashiba, Tokyo, Japan

[73] Assignee: NEC Corporation, Japan

[21] Appl. No.: 08/934,366

[22] Filed: Sep. 19, 1997

[30] Foreign Application Priority Data

Sep. 25, 1996 [JP] Japan .................................. 8-252519

[51] Int. Cl.[7] .............................................. H04N 5/335
[52] U.S. Cl. ......................... 348/320; 348/316; 348/322
[58] Field of Search .................................. 348/207, 231, 348/294, 297, 298, 302, 303, 311, 315, 316, 317, 319, 320, 321, 322, 323, 324; H04N 5/335

[56] References Cited

U.S. PATENT DOCUMENTS

| | | | |
|---|---|---|---|
| 4,314,279 | 2/1982 | Yoshida | 348/316 |
| 4,514,766 | 4/1985 | Koike et al. | 348/316 |
| 4,539,596 | 9/1985 | Elabd | 348/316 |

FOREIGN PATENT DOCUMENTS

| | | | | |
|---|---|---|---|---|
| 58-137250 | 8/1983 | Japan | | H01L 27/14 |
| 59-32264 | 2/1984 | Japan | | H04N 5/30 |
| 60-3279 | 1/1985 | Japan | | H04N 5/335 |
| 60-53382 | 3/1985 | Japan | | H04N 5/335 |
| 60-116289 | 6/1985 | Japan | | H04N 5/335 |
| 60-125082 | 7/1985 | Japan | | H04N 5/335 |
| 61-269368 | 11/1986 | Japan | | H01L 27/14 |
| 62-188491 | 8/1987 | Japan | | H04N 9/07 |
| 62-277761 | 12/1987 | Japan | | H01L 27/14 |
| 63-114473 | 5/1988 | Japan | | H04N 5/335 |
| 63-152279 | 6/1988 | Japan | | H04N 5/335 |
| 63-164360 | 7/1988 | Japan | | H01L 27/14 |
| 64-49382 | 2/1989 | Japan | | H04N 5/335 |
| 1241985 | 9/1989 | Japan | | H04N 5/335 |
| 253386 | 2/1990 | Japan | | H04N 5/335 |
| 4257171 | 9/1992 | Japan | | H04N 5/225 |
| 4334284 | 11/1992 | Japan | | H04N 5/335 |
| 595515 | 4/1993 | Japan | | H04N 5/335 |
| 6197282 | 7/1994 | Japan | | H04N 5/335 |
| 6317462 | 11/1994 | Japan | | G01J 1/02 |
| 7106546 | 4/1995 | Japan | | H01L 27/148 |
| 7264487 | 10/1995 | Japan | | H04N 5/335 |
| 7264491 | 10/1995 | Japan | | H04N 5/335 |
| 8149349 | 6/1996 | Japan | | H04N 5/225 |
| 8294055 | 11/1996 | Japan | | H04N 5/335 |
| 9129861 | 5/1997 | Japan | | H01L 27/148 |

*Primary Examiner*—Tuan Ho
*Attorney, Agent, or Firm*—Hayes, Soloway, Hennessey, Grossman & Hage, P.C.

[57] ABSTRACT

A charge-coupled device image sensor comprises a matrix array of photodiodes and a horizontal charge-coupled device (CCD). First vertical CCDs are provided, each on one side of each column of the photodiodes for receiving charge packets from the photodiodes of odd-numbered rows and moving the charge packets to the horizontal CCD and second vertical CCDs are provided, each on the other side of each column of the photodiodes for receiving charge packets from the photodiodes of even-numbered rows and moving the charge packets to the horizontal CCD. The horizontal CCD receives the charge packets from the first and second vertical CCDs and transfers the received charge packets to external circuitry. According to a modified embodiment, a second horizontal CCD is provided for receiving the charge packets from the second vertical CCDs.

5 Claims, 8 Drawing Sheets

CCD IMAGE SENSOR HAVING TWO-LAYERED ELECTRODE STRUCTURE

BACKGROUND OF THE INVENTION

1. Field of the Invention

The present invention relates generally to image sensing devices, and more specifically to a two-dimensional charge-coupled device (CCD) image sensor of the progressive scan format.

2. Description of the Related Art

The use of input devices such as digital still cameras for personal computers requires scan conversion from the interlace format to the noninterlace (progressive) format since most of these input devices are implemented with components used in the standard television systems, whereas the display system of computers is implemented with the progressive format. In order to eliminate the need for the scan conversion, the progressive scan format is increasingly adopted by current CCD (charge-coupled device) image sensors.

To implement the progressive scanning in an interline CCD image sensor, three-phase clock pulses must be used to transfer charge packets of two-dimensional image along vertical charge transfer means or CCDs to a horizontal CCD. However, one disadvantage of the three-phase transfer mode is that polysilicon electrodes must be arranged in a three-layered structure since it involves an added manufacturing step as compared with the two-layered structure of the transfer mode employed in the interlace scanning.

SUMMARY OF THE INVENTION

It is therefore an object of the present invention to provide a charge-coupled device image sensor which can be implemented with a two-layered electrode structure.

According to a first aspect of the present invention, there is provided a charge-coupled device image sensor which comprises a plurality of photodiodes arranged in a matrix array of columns and rows and a horizontal charge transfer means, or horizontal CCD. A plurality of first vertical charge transfer means, or first vertical CCDs are provided. Each of the first vertical CCDs is arranged on one side of each column of the photodiodes for receiving charge packets from the photodiodes of odd-numbered rows and moving the charge packets to the horizontal CCD. A plurality of second vertical charge transfer means, or second vertical CCDs are provided, each being arranged on the other side of each column of the photodiodes for receiving charge packets from the photodiodes of even-numbered rows and moving the charge packets to the horizontal CCD. The horizontal CCD receives the charge packets from the first and second vertical CCDs and transfers the received charge packets to external circuitry.

According to a second aspect, the present invention provides a charge-coupled device image sensor comprising a plurality of photodiodes arranged in a matrix array of columns and rows. First and second horizontal CCDs are provided. Each of a plurality of first vertical CCDs is arranged on one side of each column of the photodiodes for receiving charge packets from the photodiodes of odd-numbered rows and moving the charge packets to the first horizontal CCD. Each of a plurality of second vertical CCDs is arranged on the other side of each column of the photodiodes for receiving charge packets from the photodiodes of even-numbered rows and moving the charge packets to the second horizontal CCD. The first horizontal CCD receives the charge packets from the first vertical CCDs and transfers the received charge packets to external circuitry, and the second horizontal CCD receives the charge packets from the second vertical CCDs and moves the received charge packets to the external circuitry.

BRIEF DESCRIPTION OF THE DRAWINGS

The present invention will be described in further detail with reference to the accompanying drawings, in which.

DETAILED DESCRIPTION

Figure 1:
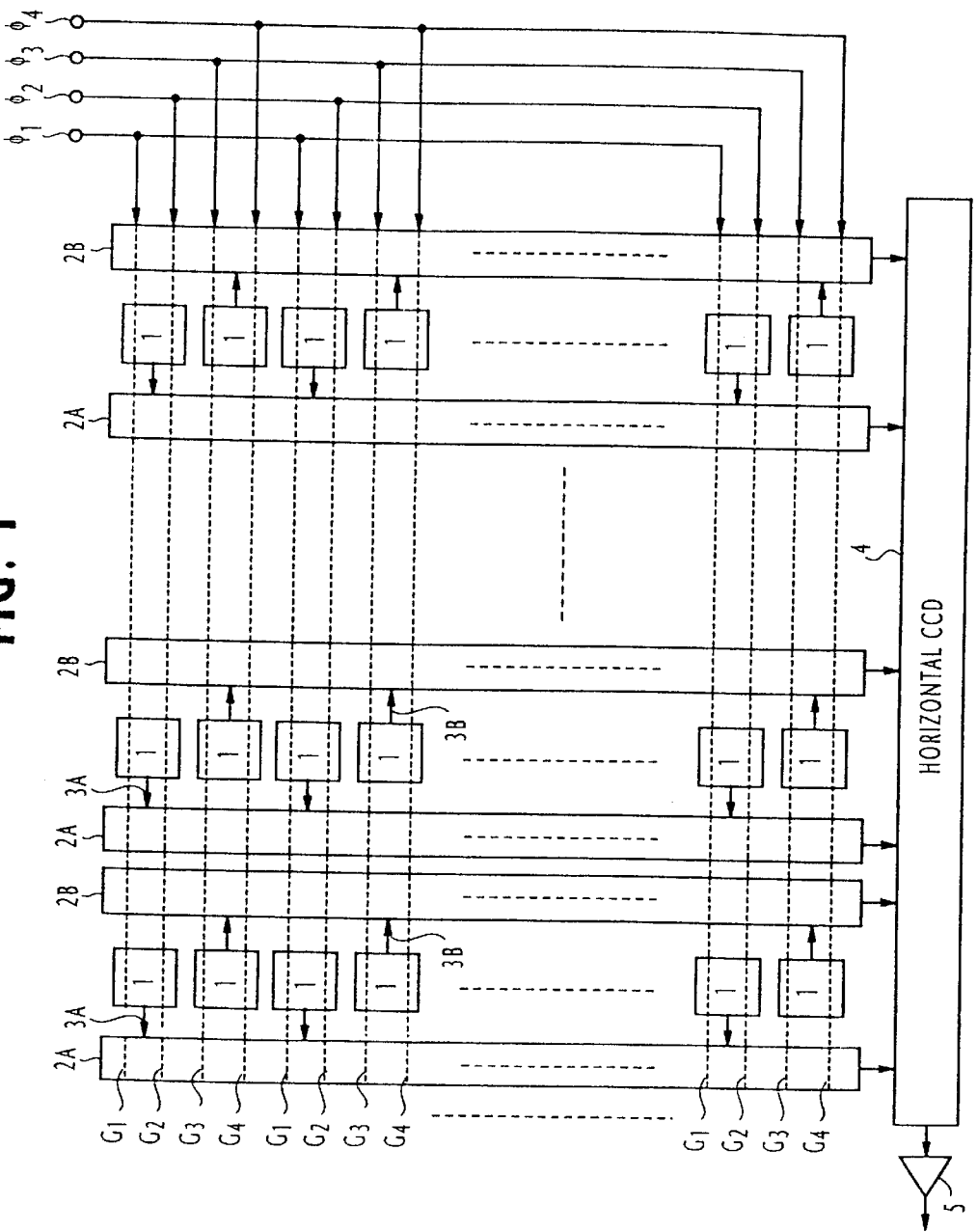
FIG. 1 is a block diagram of a CCD image sensor according to a first embodiment of the present invention.

Referring now to FIG. 1, a progressive-scan two-dimensional CCD image sensor according to a first embodiment of the present invention has a matrix array of photodiodes 1 and a plurality of vertical CCDs 2 which are divided into left-side vertical CCDs 2L and right-side vertical CCDs 2R. Each vertical CCD has a plurality of stages each having a set of four partially overlapping electrodes $G_1$, $G_2$, $G_3$ and $G_4$. The electrodes $G_1$, $G_2$, $G_3$ and $G_4$ of all vertical CCDs are respectively connected together to receive four-phases voltage clock pulses via terminals $\phi_1$, $\phi_2$, $\phi_3$ and $\phi_4$, respectively. Each stage of the vertical CCDs 2L is associated with a corresponding photodiode of odd-numbered row, and each stage of the vertical CCD 2R is associated with a corresponding photodiode of even-numbered row. A transfer gate 3L connects each odd-numbered photodiode to the associated vertical channel 2L and a transfer gate 3R connects each even-numbered photodiode to the associated vertical channel 2R. All vertical channels 2L and 2R are connected to successive stages of a horizontal CCD 4 whose output is coupled to external circuitry via an amplifier stage 5.

Figure 2:
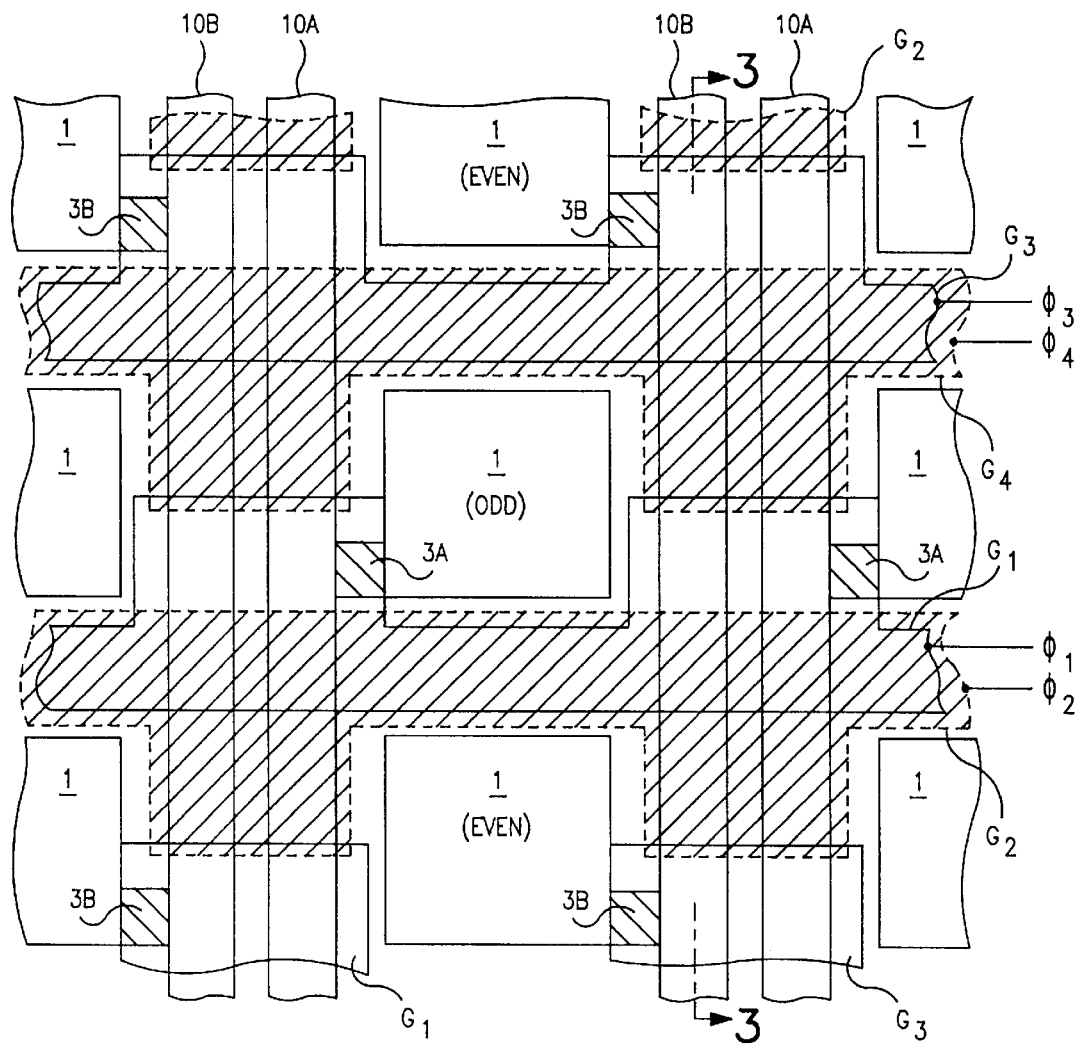
FIG. 2 is an enlarged plan view of a portion of the image sensor of FIG. 1.
Figure 3:
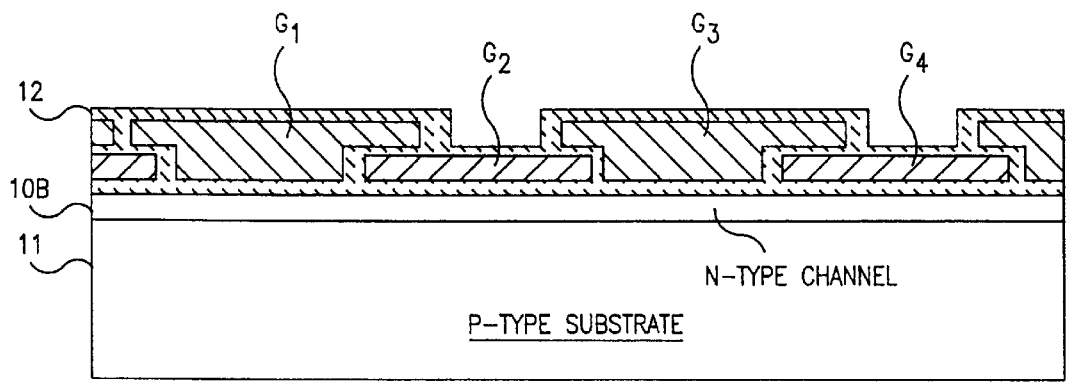
FIG. 3 is a cross-sectional view taken along the lines 3—3 of FIG. 2.

As shown in FIG. 2, vertical CCDs 2L and 2R are formed by n-type semiconductor channels 10A and 10B running parallel between columns of the photodiodes 1. Transfer gates 3L are provided between photodiodes of odd-numbered rows and channels 10A and transfer gates 3R are provided between photodiodes of even-numbered rows and channels 10B. Electrodes $G_1$ are formed in overlying relationship with transfer gates 3R and electrodes $G_3$ are formed in overlying relationship with transfer gates 3L, so that when these electrodes are driven to a high trigger voltage, the corresponding underlying transfer gates 3 are turned on to cause electrons to be transferred from the corresponding photodiodes to the associated channels 10. As clearly shown in FIG. 3, the n-type semiconductor channels 10 are formed on a p-type substrate 11 and electrodes $G_1$ and $G_3$ are successively formed on the n-type channels 10 in a partially overlying relationship with adjacent electrodes $G_2$ and $G_4$. The electrodes $G_1$ to $G_4$ are embedded in a silicon dioxide layer 12.

The operation of the image sensor of the first embodiment will be described below with reference to FIGS. 4 and 5.

Figure 4:
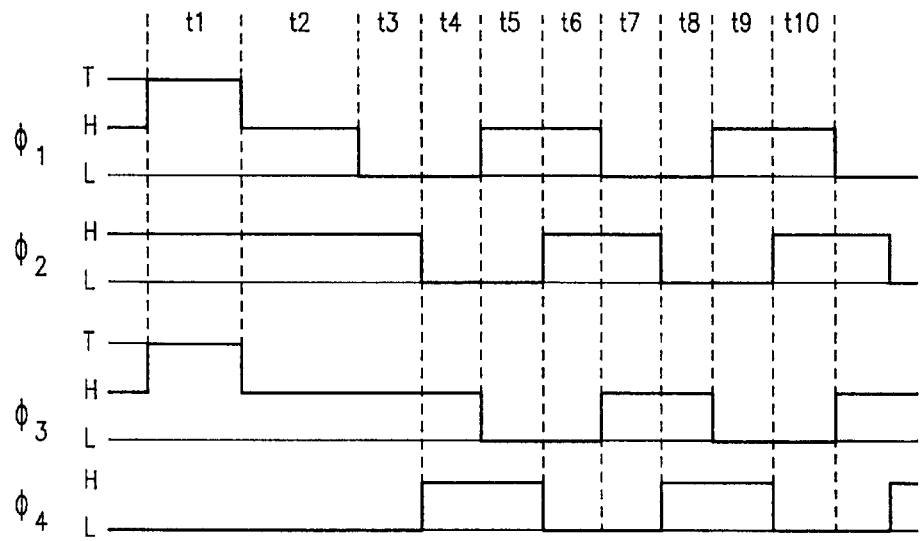
FIG. 4 is a timing diagram associated with the first embodiment of the invention.
Figure 5:
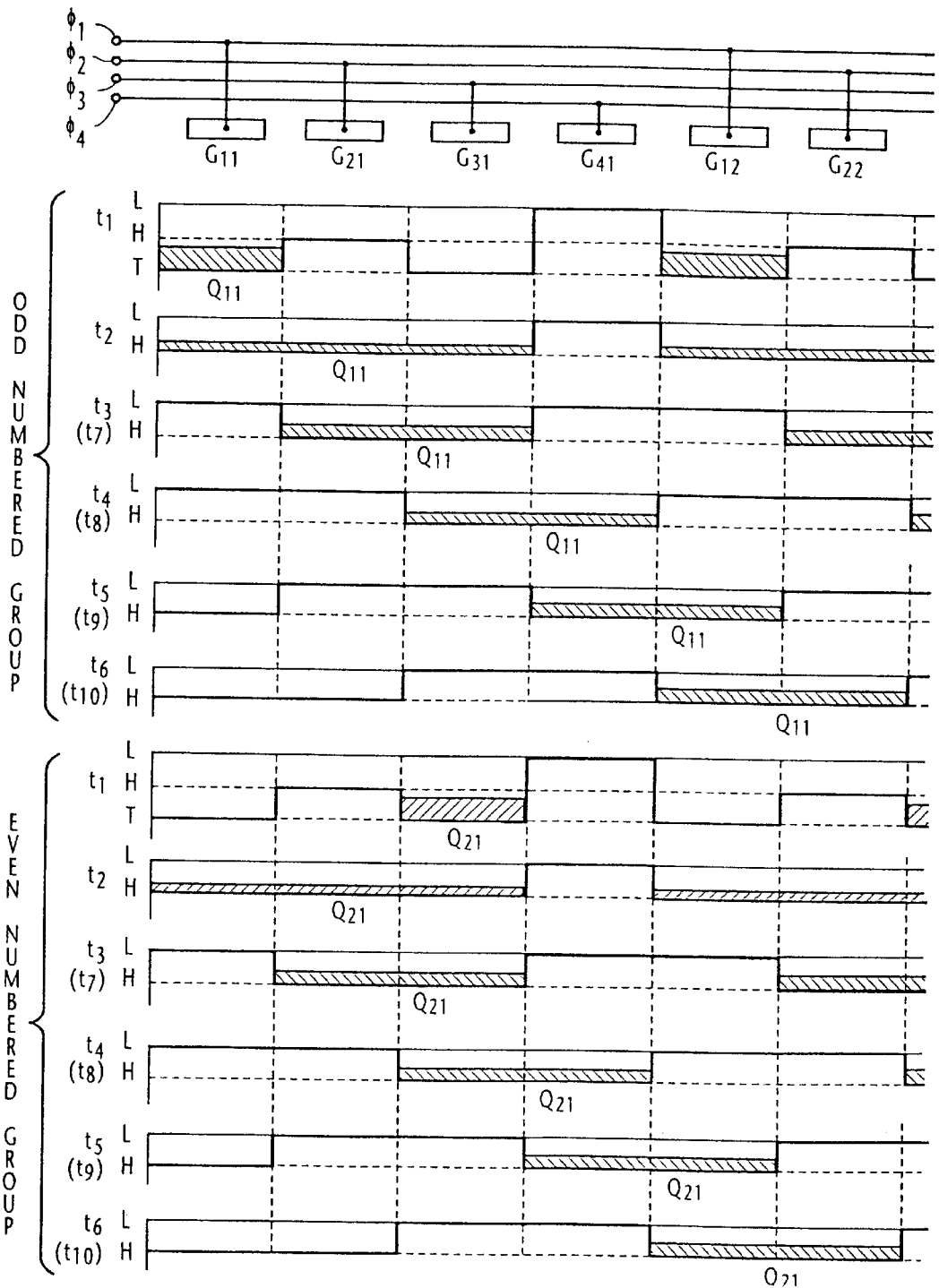
FIG. 5 is a potential diagram showing charge packets successively transferred as a result of the application of the clock pulses of FIG. 4.

During period $t_1$, the clock pulse terminals $\phi_1$ and $\phi_3$ are supplied with an excitation pulse of triggering level (T) and the terminals $\phi_2$ and $\phi_4$ are maintained at high (H) and low (L) voltage levels, respectively, as shown in FIG. 4. Electrodes $G_{11}$ and $G_{31}$ are driven to a level sufficient to turn on all the transfer gates 3L, 3R. This results in the charge packets in the odd-numbered-row photodiodes being dumped into the vertical channels 10A and trapped under the electrode $G_{11}$ as indicated by $Q_{11}$ and packets in the even-numbered-row photodiodes being dumped into the vertical channels 10B and trapped under the electrode $G_3$ as indicated by $Q_{21}$ (see FIG. 5). During period $t_2$, terminals $\phi_1$, $\phi_2$, $\phi_3$ are driven to the high level, so that the charge packets $Q_{11}$ and $Q_{21}$ spread under electrodes $G_{11}$, $G_{21}$, $G_{31}$ ($G_{12}$ and $G_{22}$).

During period $t_3$, terminals $\phi_2$ and $\phi_3$ are switched to the high level, and portions of the charge packets $Q_{11}$ and $Q_{21}$ under electrodes $G_{11}$ move to electrodes $G_{21}$ and $G_{31}$.

During period $t_4$, terminals $\phi_3$ and $\phi_4$ are switched to the high level, and the charge packets $Q_{11}$ and $Q_{21}$ move one electrode position and trapped under electrodes $G_{31}$ and $G_{41}$. In like manner, terminals $\phi_1$ and $\phi_4$ are switched to the high level during period $t_5$ to shift the charge packets to electrodes $G_{41}$ and $G_{12}$, and terminals $\phi_1$ and $\phi_2$ are switched to the high level during period $t_6$ to shift the charge packets to electrodes $G_{12}$ and $G_{21}$, thus completing a transfer cycle of charge packets using clock pulses of a 90-degree phase difference. Similar events continue during periods $t_7$ to $t_{10}$ corresponding respectively to the events of periods $t_3$ to $t_6$.

Therefore, charge packets of odd- and even-numbered rows are transferred down at the same speed and arrive at the horizontal CCD 4 at the same time where they are shifted along to the amplifier stage 5 for delivery to external circuitry.

A second embodiment of the present invention is shown in FIGS. 6, 7, 8A and 8B. According to this embodiment, a first horizontal CCD 4A is connected to vertical CCDs 2A and a second horizontal CCD 4B is connected to vertical CCDs 2B. Electrodes $G'_1$ to $G'_4$ extend horizontally cross the vertical CCDs 2A and 2B such that, at vertical CCDs 2A, the electrodes $G'_1$ and $G'_2$ are reversed in position, and the electrodes $G'_3$ and $G'_4$ are likewise reversed in position. As a result, charge packets in the vertical CCDs 2A are transferred upwards to horizontal CCD 5A by electrodes arranged in the order of $G'_2$, $G'_1$, $G'_4$ and $G'_3$, while charge packets in the vertical CCDs 2B are transferred downwards to horizontal CCD 5B by electrodes arranged in the order of $G'_1$, $G'_2$, $G'_3$ and $G'_4$. Electrodes $G'_1$ to $G'_4$ are respectively connected to terminals $\phi'_1$ to $\phi'_4$ to which four-phase clock pulses are applied.

Figure 7:
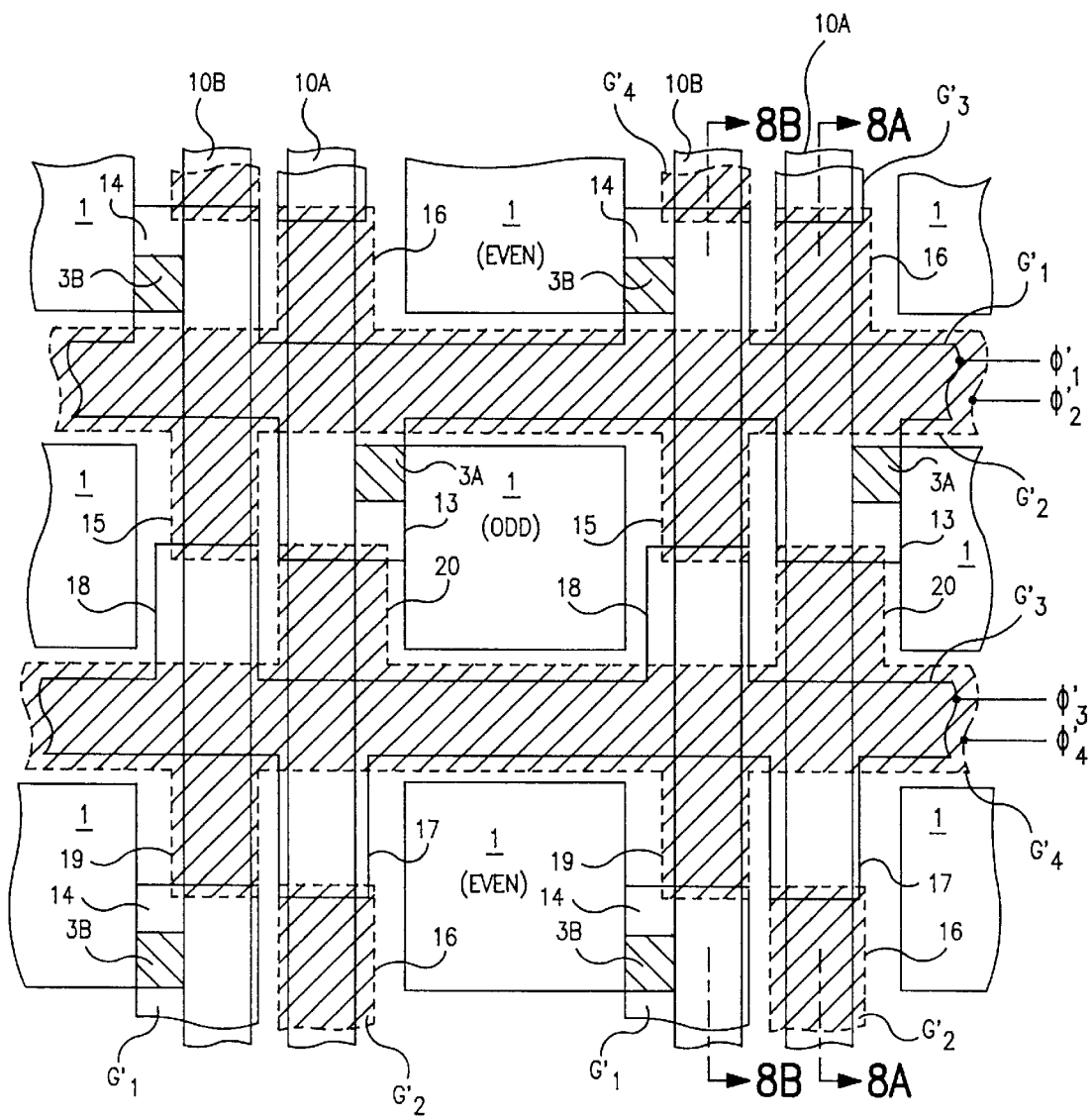
FIG. 7 is an enlarged plan view of a portion of the image sensor of FIG. 6.

As shown in detail in FIG. 7, electrode $G'_1$ is formed with oppositely extending rectangular portions 13 and 14, with the portions 13 extending downwards along vertical channels 10A covering transfer gates 3A and the portions 14 extending upwards along vertical channels 10B covering transfer gates 3B. Electrode $G'_2$ has oppositely extending rectangular portions 15 and 16, with the portions extending downwards along vertical channels 10B and the portions 16 extending upwards along vertical channels 10A. In a similar manner, electrode $G'_3$ has oppositely extending portions 17 and 18, with the portions extending along vertical channels 10A and the portions 18 extending along vertical channels 10B. Electrode $G'_4$ is formed with oppositely extending portions 19 and 20, with the portions 19 extending downwards along vertical channels 10B and the portions 20 extending upwards along vertical channels 10A. Overlapping portions are provided between adjacent portions 16 and 17, between adjacent portions 15 and 18, between adjacent portions 14 and 19, and between adjacent portions 13 and 20.

Figure 8A:
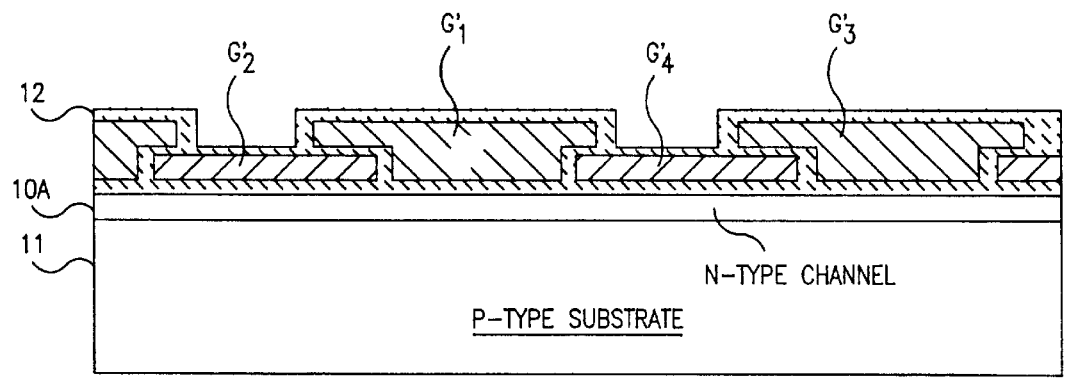
FIGS. 8A and 8B are cross-sectional views taken along the lines 8A—8A and 8B—8B of FIG. 7, respectively.
Figure 8B:
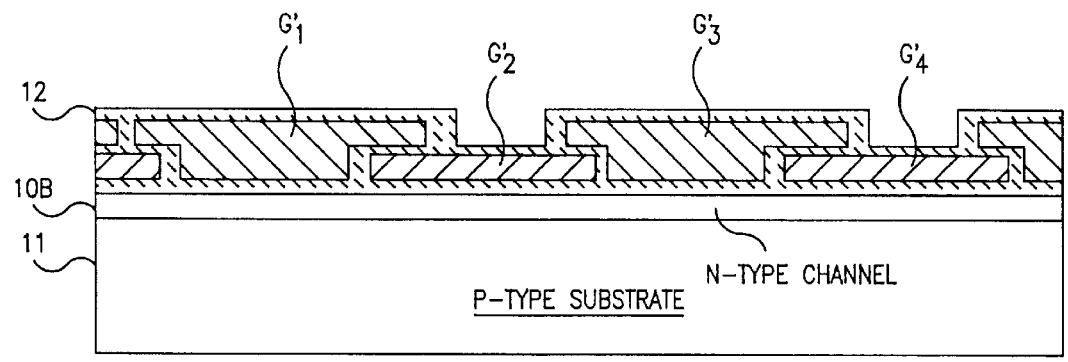

With this layout, electrodes $G'_1$, $G'_2$, $G'_3$, $G'_4$ are arranged along the n-type channels 10A in a recurrent series of $G'_2$, $G'_1$, $G'_4$, $G'_3$ as illustrated in FIG. 8A for transferring charge packets of odd-numbered rows to the horizontal CCD 5A and in a recurrent series of $G'_1$, $G'_2$, $G'_3$, $G'_4$ along the n-type channels 10B as illustrated in FIG. 8B for transferring charge packets of even-numbered rows to the horizontal CCD 5B.

Figure 9:
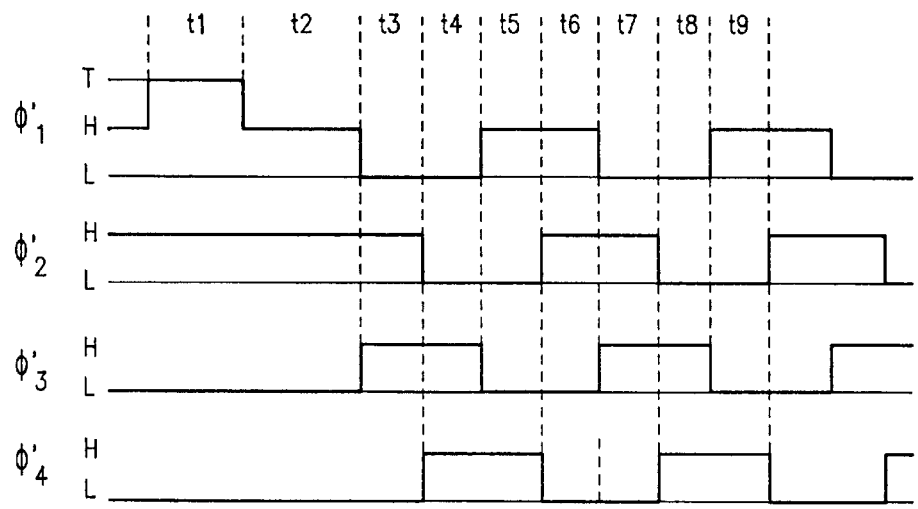
FIG. 9 is a timing diagram associated with the second embodiment of the invention.

The four-phase voltage clock pulses supplied to these electrodes are shown in FIG. 9. It is seen that only one excitation pulse is used in the clock pulse sequences. In comparison with the use of two excitation pulses of the previous embodiment, the use of only one excitation pulse is advantageous in that it eliminates the need for precision timing alignment of two excitation pulses.

Figure 10A:
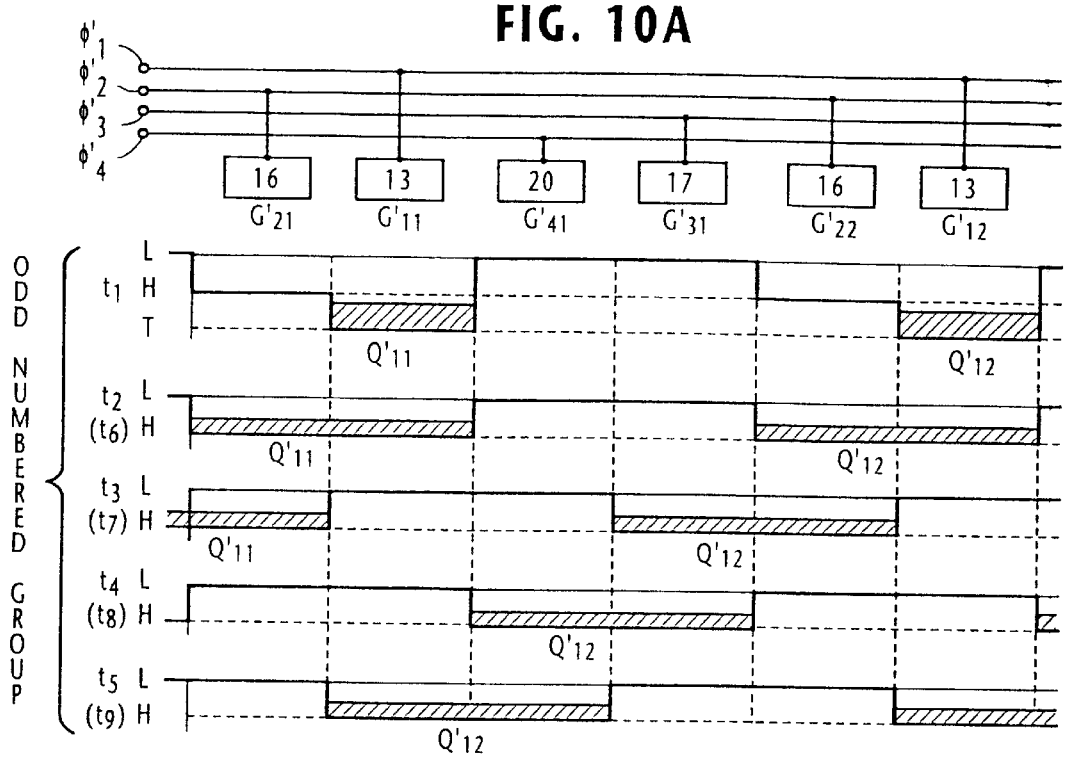
FIGS. 10A and 10B are potential diagrams showing charge packets successively transferred as a result of the application of the clock pulses of FIGS. 9.

The operation of the CCD image sensor of the second embodiment will be described below with reference to FIGS. 9, 10A and 10B.

During period $t_1$, the clock pulse terminal $\phi'_1$ is supplied with an excitation pulse of triggering level (T) while terminal $\phi'_2$ is maintained at high voltage level (H) and terminals $\phi'_3$ and $\phi'_4$ are both maintained at low voltage level (L). Electrodes $G'_{11}$ and $G'_{12}$ are driven to a level sufficient to turn on all the transfer gates 3L, 3R. This causes charge packets $Q'_{11}$ and $Q'_{12}$ in the odd-numbered-row photodiodes to be dumped into the vertical channels 10A and trapped under the portions 13 of electrodes $G'_{11}$ and $G'_{12}$ respectively (FIG. 10B), and causes charge packets $Q'_{21}$ and $Q'_{22}$ in the even-numbered-row photodiodes to be dumped into the vertical channels 10B and trapped under the portions 14 of electrodes $G'_{11}$ and $G'^{12}$ respectively (FIG. 10B).

During period $t_2$, terminals $\phi'_1$ and $\phi'_2$ are maintained at the high level while the other terminals are switched to the low level, so that the charge packet $Q'_{11}$ spreads under the portions 13 and 16 of electrodes $G'_{11}$ and $G'_{21}$ and charge packet $Q'_{12}$ spreads under the portions 13 and 16 of electrodes $G'_{12}$ and $G'_{22}$. Similarly, the charge packet $Q'_{21}$ spreads under the portions 14 and 15 of electrodes $G'_{11}$ and $G'_{21}$ and the charge packet $Q'_{22}$ spreads under the portions 14 and 15 of electrodes $G'_{12}$ and $G'_{22}$.

Figure 10B:
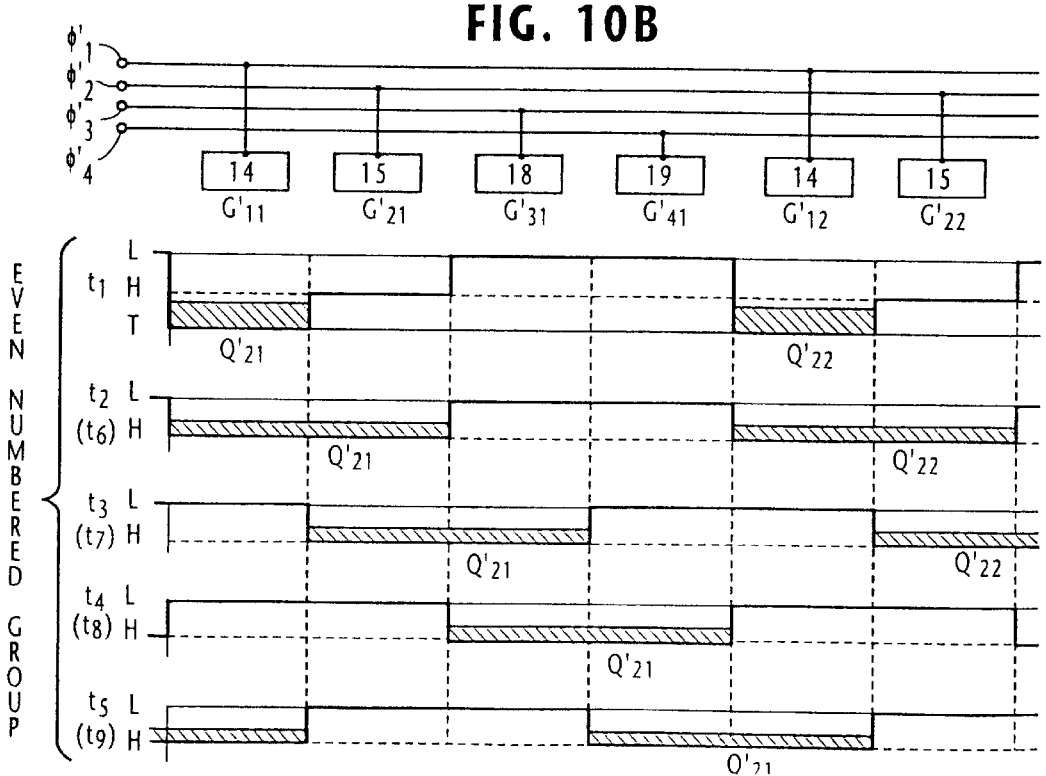

During period $t_3$, terminals $\phi'_2$ and $\phi'_3$ are switched to the high level, and the charge packet $Q'_{12}$, for example, moves to the left one electrode position to electrodes $G'_{22}$ and $G'_{31}$, (FIG. 10A), and the charge packet $Q'_{21}$, for example, moves to the right one electrode position to electrodes $G'_{21}$ and $G'_{31}$ (FIG. 10B).

During period $t_4$, terminals $\phi'_3$ and $\phi'_4$ are switched to the high level, and the charge packets $Q'_{11}$ move one electrode position to the left and trapped under the portions 17 and 20 of electrodes $G'_{31}$ and $G'_{41}$ (FIG. 10A) and the charge packets $Q'_{21}$ move one electrode position to the right and trapped under the portions 18 and 19 of electrodes $G'_{31}$ and $G'_{41}$ (FIG. 10B). In like manner, terminals $\phi'_1$ and $\phi'_4$ are switched to the high level during period $t_5$ to shift the charge packets to electrodes $G'_{41}$ and $G'_{12}$, and terminals $\phi'_1$ and $\phi'_2$ are switched to the high level during period $t_6$ to shift the charge packets to electrodes $G'_{12}$ and $G'_{21}$, thus completing a transfer cycle of charge packets. Similar events continue during periods $t_7$ to $t_9$ corresponding respectively to the events of periods $t_3$ to $t_5$.

Therefore, the charge packets of odd-numbered rows are transferred to the horizontal CCD 4A where they are shifted along to the amplifier 5A. On the other hand, the charge packets of even-numbered rows are transferred to the horizontal CCD 4B where they are shifted along to the amplifier 5B.

Figure 6:
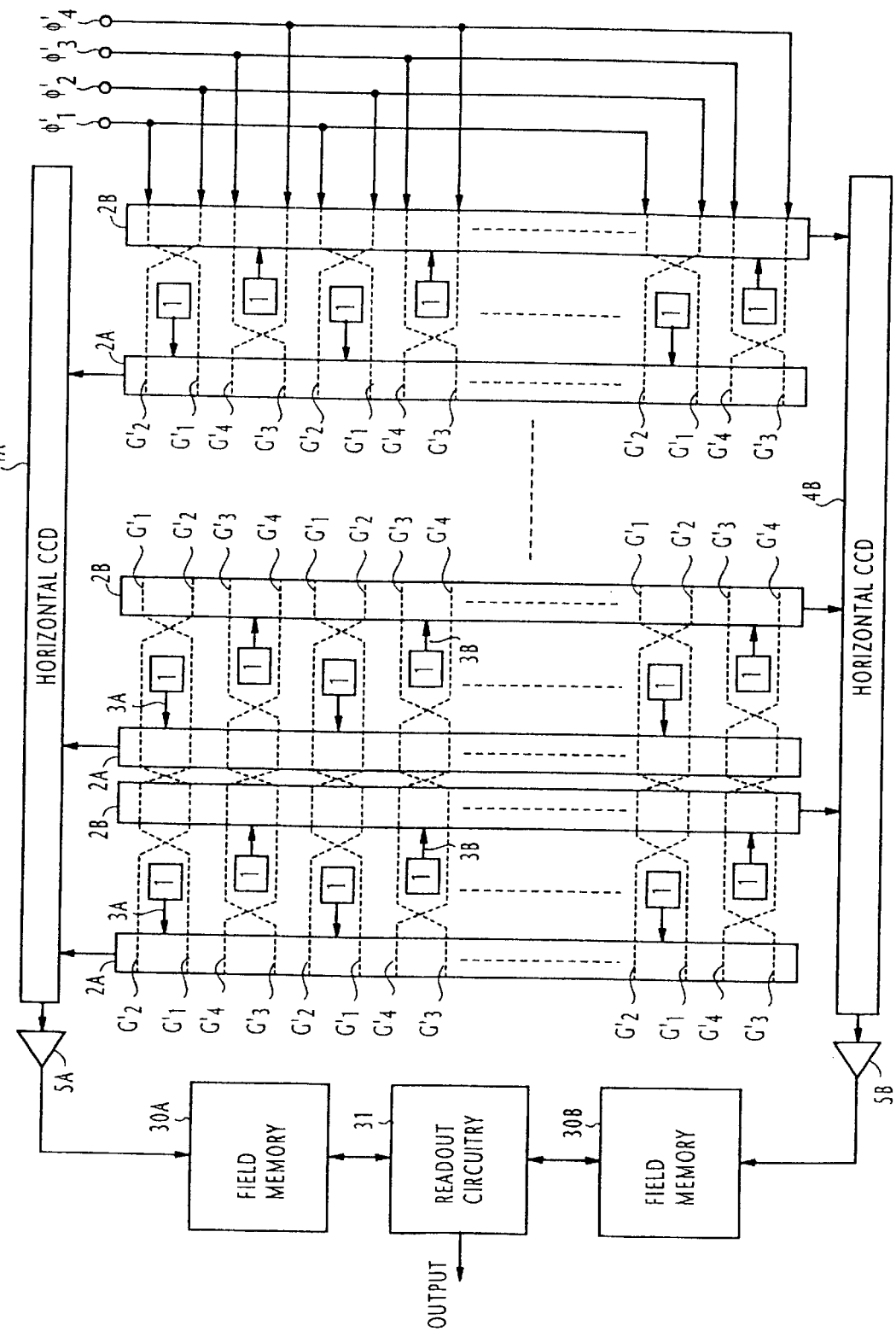
FIG. 6 is a block diagram of a CCD image sensor according to a second embodiment of the present invention.

As shown in FIG. 6, the outputs of the CCD image sensor are delivered from amplifiers 5A and 5B and respectively stored into field memories 30A and 30B to accommodate their relative timing differences. The stored signals are then read out by readout circuitry 31. One advantage of this embodiment is that the field signals stored in memories 30A and 30B can be read either in a progressive format or an interlace format depending on applications.

What is claimed is:

1. A charge-coupled device image sensor comprising:

a plurality of photodiodes arranged in a matrix array of columns and rows;

a plurality of first vertical charge transfer channels each being arranged on one side of each column of said photodiodes for receiving charge packets from the photodiodes of odd-numbered rows;

a plurality of second vertical charge transfer channels each being arranged on the other side of each column of said photodiodes for receiving charge packets from the photodiodes of even-numbered rows;

first horizontal charge transfer means for receiving the charge packets from the first vertical charge transfer channels and moving the received charge packets to external circuitry;

second horizontal charge transfer means for receiving the charge packets from the second vertical charge transfer channels and moving the received charge packets to the external circuitry;

a matrix array of transfer gates respectively coupled to said photodiodes such that charge packets from the photodiodes of odd-numbered rows are transferred to the first vertical charge transfer channels and charge packets from the photodiodes of even-numbered rows are transferred to the second vertical charge transfer channels; and a plurality of sets of first, second, third and fourth electrodes, each electrode set corresponding to a group of three adjacent rows of said photodiodes such that said first and second electrodes correspond to first and second rows of said group and said third and fourth electrodes correspond to second and third rows of said group.

2. A charge-coupled device image sensor as claimed in claim 1, wherein said first clock pulse sequence includes an excitation pulse for simultaneously transferring the charge packets from the photodiodes of said each column to the charge transfer channel of each of said first and second vertical charge transfer means.

3. A charge-coupled device image sensor as claimed in claim 1, further comprising means for combining output signals from said first and second horizontal charge transfer means.

4. A charge-coupled device image sensor as claimed in claim 3, wherein said combining means comprises:

a first memory for storing the output signal of said first horizontal charge transfer means;

a second memory for storing the output signal of said second horizontal charge transfer means; and means for reading contents of said first and second memories.

5. A charge-coupled device image sensor as claimed in claim 2, wherein said first electrodes are formed with first overlying portions for applying said excitation pulse to a first plurality of said transfer gates and said first clock pulse sequence to the first vertical charge transfer channels and second overlying portions for applying said excitation pulse to a second plurality of said transfer gates and said first clock pulse sequence to the second vertical charge transfer channels, wherein said second electrodes are formed with third overlying portions for applying said second clock pulse sequence to the second vertical charge transfer channels and fourth overlying portions for applying said second clock pulse sequence to the first vertical charge transfer channels, said third and fourth overlying portions being arranged diagonally with respect to said first and second overlying portions, wherein said third electrodes are formed with fifth overlying portions for applying said third clock pulse sequence to the first vertical charge transfer channels and sixth overlying portions for applying said third clock pulse sequence to the second vertical charge transfer channels, and wherein said fourth electrodes are formed with seventh overlying portions for applying said fourth clock pulse sequence to the second vertical charge transfer channels and eighth overlying portions for applying said fourth clock pulse sequence to the first vertical charge transfer channels, said seventh and eighth overlying portions being arranged diagonally with respect to said fifth and sixth overlying portions.

* * * * *